United States Patent [19]
Cucheran et al.

[11] Patent Number: 5,657,913
[45] Date of Patent: Aug. 19, 1997

[54] SKI RACK HAVING CLAMPING MECHANISM

[75] Inventors: John S. Cucheran, Lake Orion; Jeffrey M. Aftanas, Sterling Heights; Jon D. Sparham, Waterford, all of Mich.

[73] Assignee: JAC Products, Inc., Ann Arbor, Mich.

[21] Appl. No.: 497,209

[22] Filed: Jun. 30, 1995

[51] Int. Cl.$^6$ ........................................ B60R 9/00
[52] U.S. Cl. .................... 224/319; 224/309; 224/314; 224/315; 224/324; 224/546; 224/547; 224/558
[58] Field of Search ........................... 224/309, 314, 224/315, 317, 319, 324, 325, 328–331, 917.5, 546, 547, 548, 555, 558

[56] References Cited

U.S. PATENT DOCUMENTS

| | | | |
|---|---|---|---|
| 3,223,302 | 12/1965 | Helm | 224/917.5 |
| 3,848,785 | 11/1974 | Bott | 224/917.5 |
| 4,930,671 | 6/1990 | Tittel | 224/319 |
| 5,054,673 | 10/1991 | Dixon | 224/324 |
| 5,275,320 | 1/1994 | Duemmler | 224/319 |
| 5,419,479 | 5/1995 | Evels et al. | 224/319 |
| 5,456,397 | 10/1995 | Pedrini | 224/324 |

FOREIGN PATENT DOCUMENTS 0487131  5/1992  United Kingdom ............. 224/917.5

*Primary Examiner*—Henry J. Recla
*Assistant Examiner*—Timothy L. Maust
*Attorney, Agent, or Firm*—Harness, Dickey & Pierce

[57] ABSTRACT

A ski rack having a pair of integrally formed hook portions and a pair of integrally formed channels which are adapted to help enable the ski rack to be secured to a cross bar or other like support member of an existing vehicle article carrier. The ski rack includes a pair of independent securing members also having a pair of hook portions which slidably engage within the pair of integrally formed channels and cooperate with the integrally formed hook portions to clamp the ski rack to an associated cross bar of the existing vehicle article carrier. The independent securing members of the ski rack are further adjustable to accommodate cross bars of varying cross-sectional widths and do not require any disassembly of the cross bar or any other component part of the vehicle article carrier before the ski rack is to be secured to the cross bar. The ski rack is also quickly and easily removable from its associated cross bar with a minimum number of steps and without the need for special tools or time consuming removal procedures.

20 Claims, 3 Drawing Sheets

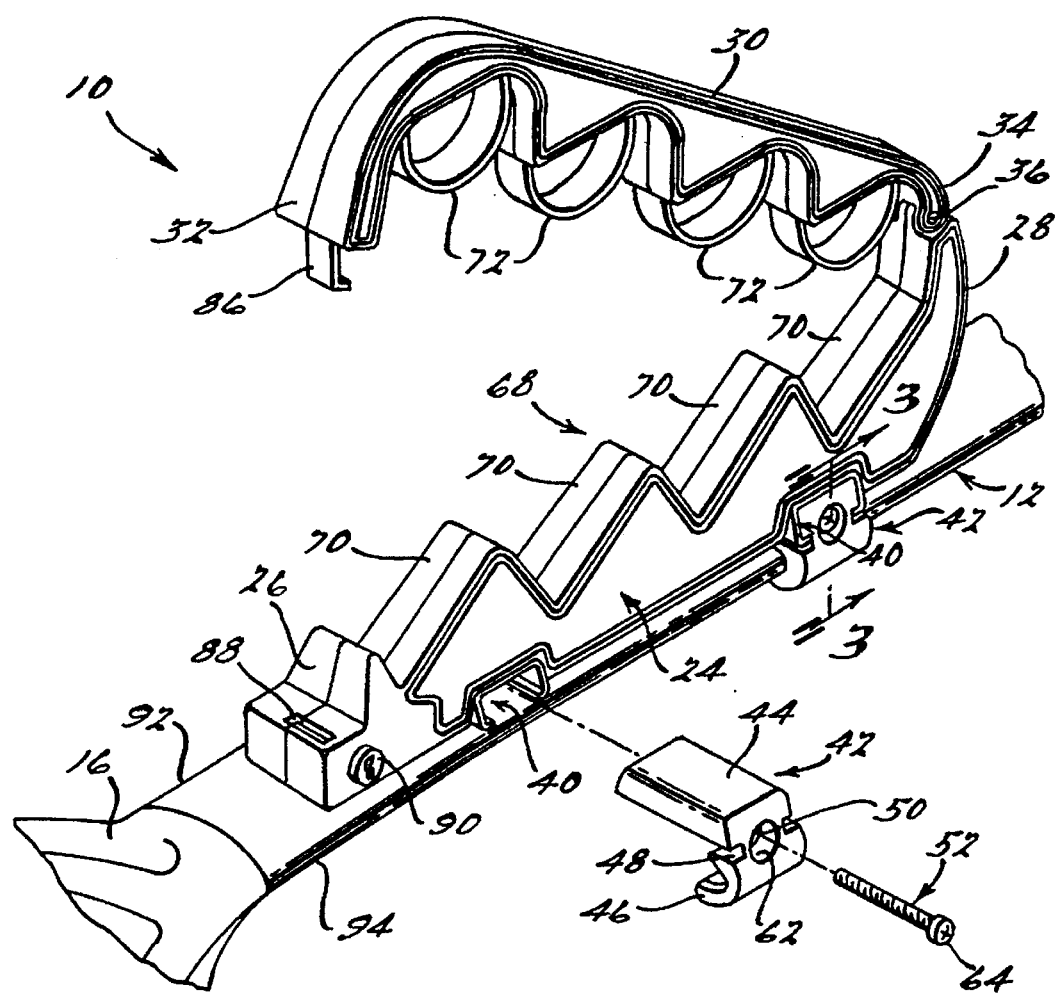
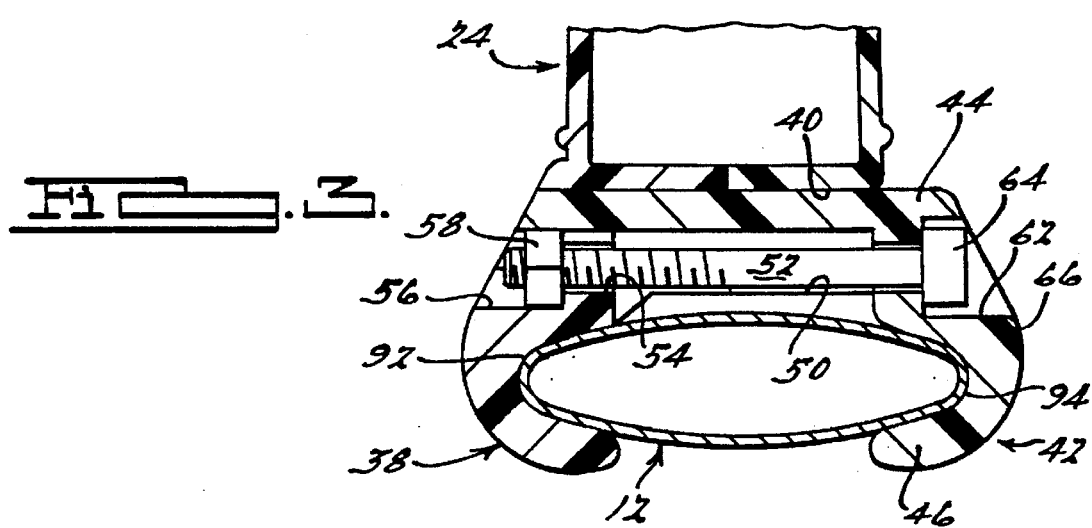

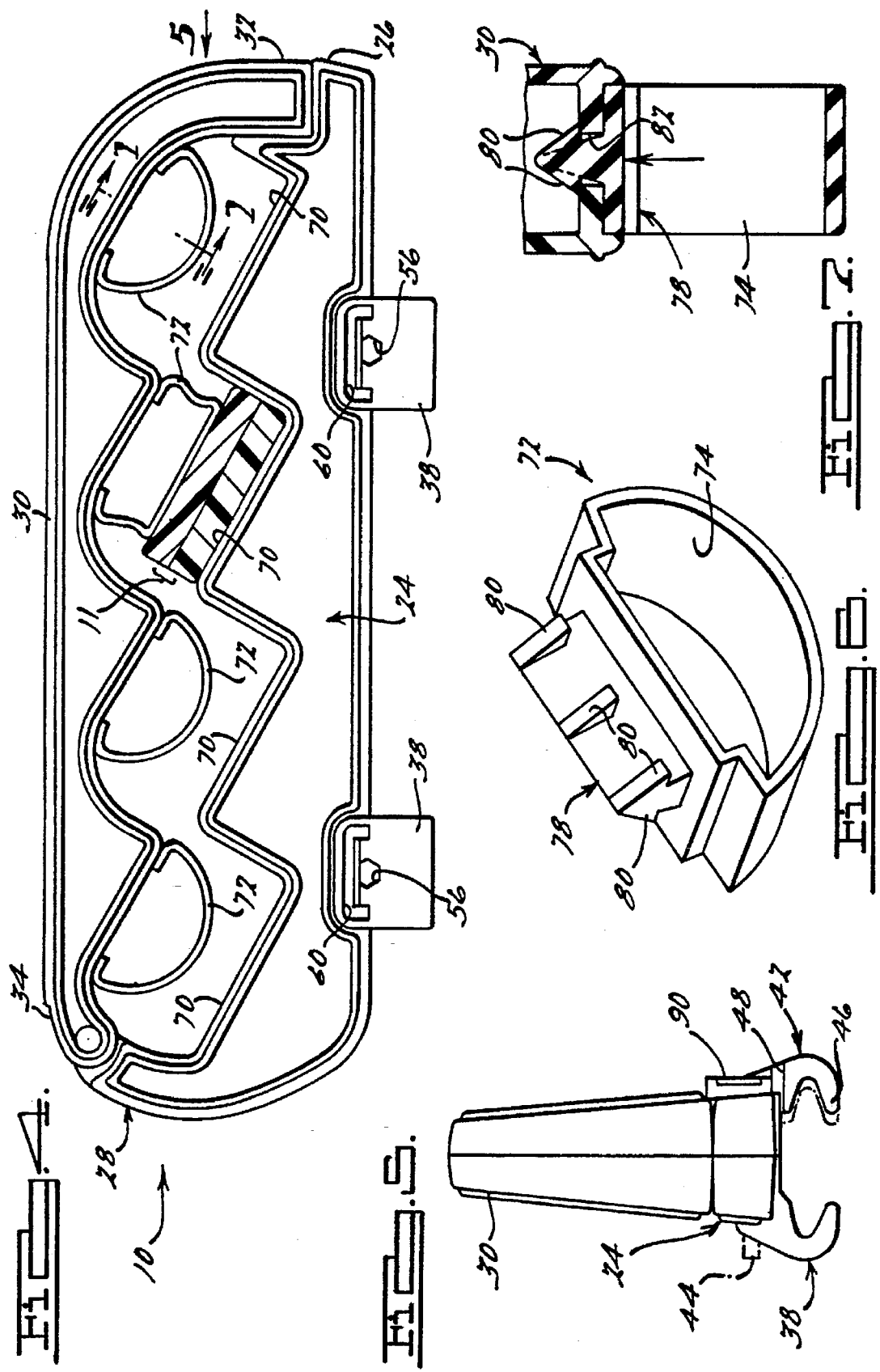

SKI RACK HAVING CLAMPING MECHANISM

BACKGROUND OF THE INVENTION

1. Technical Field

This invention relates to vehicle article carriers, and more particularly to a ski rack attachment for an existing vehicle article carrier having a conventional cross bar positioned above an outer body surface of the vehicle.

2. Discussion

Ski racks have been produced in a variety of forms for supporting a plurality of skis, such as snow skis or water skis, as well as ski poles and other like articles, above an outer body surface of a vehicle such as a roof or deck lid to make transporting such articles easier and more convenient. Prior developed ski racks have often involved complex and dedicated structure which is required to be secured to the outer body surface of a vehicle. Other forms of ski racks have involved various forms of ski rack attachments that have required additional hardware, and often extensive hardware, to enable them to be secured to existing components such as cross bars of an existing vehicle article carrier.

While such ski racks have operated generally satisfactorily for their intended purpose, the inconvenience associated with attaching and removing such ski racks from existing vehicle article carrier components, such as cross bars, has often made prior developed ski racks cumbersome to use. The requirement for numerous additional component parts to enable the ski rack attachment to be secured to the existing vehicle article carrier has often introduced added expense in the manufacture of such ski racks, as well as added complexity to the process of attaching and removing such ski racks from existing vehicle article carrier components.

Accordingly, it would be highly desirable to provide a ski rack attachment for supporting a plurality of skis and/or related articles such as ski poles which may be quickly and easily secured to a cross bar or like supporting member of an existing vehicle article carrier. Such a ski rack attachment would preferably include some means for securing the attachment directly to the cross bar or like member of the vehicle article carrier without the need for extensive assembly or disassembly steps, and without the need for a variety of tools.

Accordingly, it is a principal object of the present invention to provide a ski rack attachment which is adapted to be quickly and easily secured to an existing cross bar or other like support member of an existing vehicle article carrier, without the need for extensive assembly or disassembly steps being required for effecting attachment or removal of the ski rack attachment to the cross bar.

It is another object of the present invention to provide a ski rack which can further be quickly and easily attached and detached from a cross bar of an existing vehicle article carrier without the need for special tools.

It is still another object of the present invention to provide a ski rack which has an integrally formed portion adapted to clampingly engage a portion of a cross bar of an existing vehicle article carrier, and a separate, independent securing member adapted to be secured to the ski rack to enable the ski rack to be secured to the cross bar with a minimum number of external component parts.

It is still another object of the present invention to provide a ski rack attachment which is easily adjustably positioned along a length of a cross bar of an existing vehicle article carrier to allow for loads to be distributed evenly along the cross bar or to permit other cargo to be secured to the cross bar.

SUMMARY OF THE INVENTION

The above and other objects are provided by a ski rack in accordance with preferred embodiments of the present invention. The ski rack generally includes a base portion and a clamping arm member. The clamping arm member is pivotally secured to a portion of the base portion and moveable between an open position and a closed position. The base portion includes at least one support surface adapted to support an article, such as a snow ski or water ski, thereon. The base portion also includes at least one integrally formed hook portion adapted to engage a first side portion of a cross bar of an existing vehicle article carrier secured to an outer body surface of a vehicle. Also integrally formed with the base portion is a channel which is adapted to slidably receive an independent securing member. The independent securing member includes an integrally formed hook portion which is adapted to abuttingly engage a second side portion of the cross bar. A fastening member is included which secures the independent securing member to the base portion such that the base portion of the ski rack is releasably clamped to the cross bar.

In a preferred embodiment, the base portion includes a pair of integrally formed hook portions at spaced apart positions along the length thereof. A pair of channels are integrally formed in the base portion in alignment with the integrally formed hook portions. A pair of independent securing members are slidably insertable into the channels to allow the base portion to be clamped to the cross bar at two spaced apart locations on the cross bar. Each one of the independent securing members includes a fastening member which prevents the base portion from being removed from the cross bar once attached thereto. The ski rack is easily longitudinally positioned along the cross bar once the fastening members are loosened and quickly and easily detachable from the cross bar without the need for special tools or extensive assembly or disassembly steps.

In one preferred embodiment, the clamping arm member of the ski rack includes a latch member protruding therefrom and the base portion includes a locking assembly. The latch member is adapted to cooperate with the locking assembly to maintain the clamping arm member in its closed position, to thereby enable an article, such as a ski, to be clamped between the support surface of the base portion and the clamping arm member. In one preferred embodiment, the clamping arm member includes at least one flexible, semi-circular member adapted to abuttingly engage an article such as a ski which is positioned on the support surface of the base member when the clamping arm member is moved into its closed position, to thereby clamp a portion of the article within the ski rack.

In a preferred embodiment of the present invention, the base portion includes a saw-tooth shaped upper surface which forms a plurality of independent support surfaces disposed at an acute angle from the outer body vehicle surface. The clamping arm member, in this embodiment, includes a plurality of flexible, semi-circular members spaced along the clamping arm member so as to lay over each of the support surfaces when the clamping arm member is moved into a closed position. The ski rack can thus accommodate a plurality of pairs of articles such as skis without requiring any modification to the ski rack itself or any other component of the existing vehicle article carrier.

3

BRIEF DESCRIPTION OF THE DRAWINGS

The various advantages of the present invention will become apparent to one skilled in the art by reading the following specification and subjoined claims and by referencing the following drawings in which:

FIG. 2 is a perspective view of a portion of the cross bar of the vehicle article carrier shown in FIG. 1 showing in enlarged perspective fashion a preferred embodiment of the ski rack of the present invention;

FIG. 3 is a cross-sectional end view taken in accordance with section line 3—3 in FIG. 2 of the ski rack of FIG. 2, engaged around the cross bar;

FIG. 4 is an elevational front view of the ski rack of FIG. 2 showing the ski rack in the closed position;

FIG. 5 is a right end view of the ski rack of FIG. 4 taken in accordance with directional arrow 5—5 in FIG. 4;

FIG. 6 is a perspective view of one of the flexible, semi-circular members of the ski rack; and FIG. 7 is a partial cross-sectional view of the flexible, semi-circular member secured to the clamping arm member of the ski rack, taken in accordance with section line 7—7 in FIG. 5.

DETAILED DESCRIPTION OF THE PREFERRED EMBODIMENTS

Figure 1:
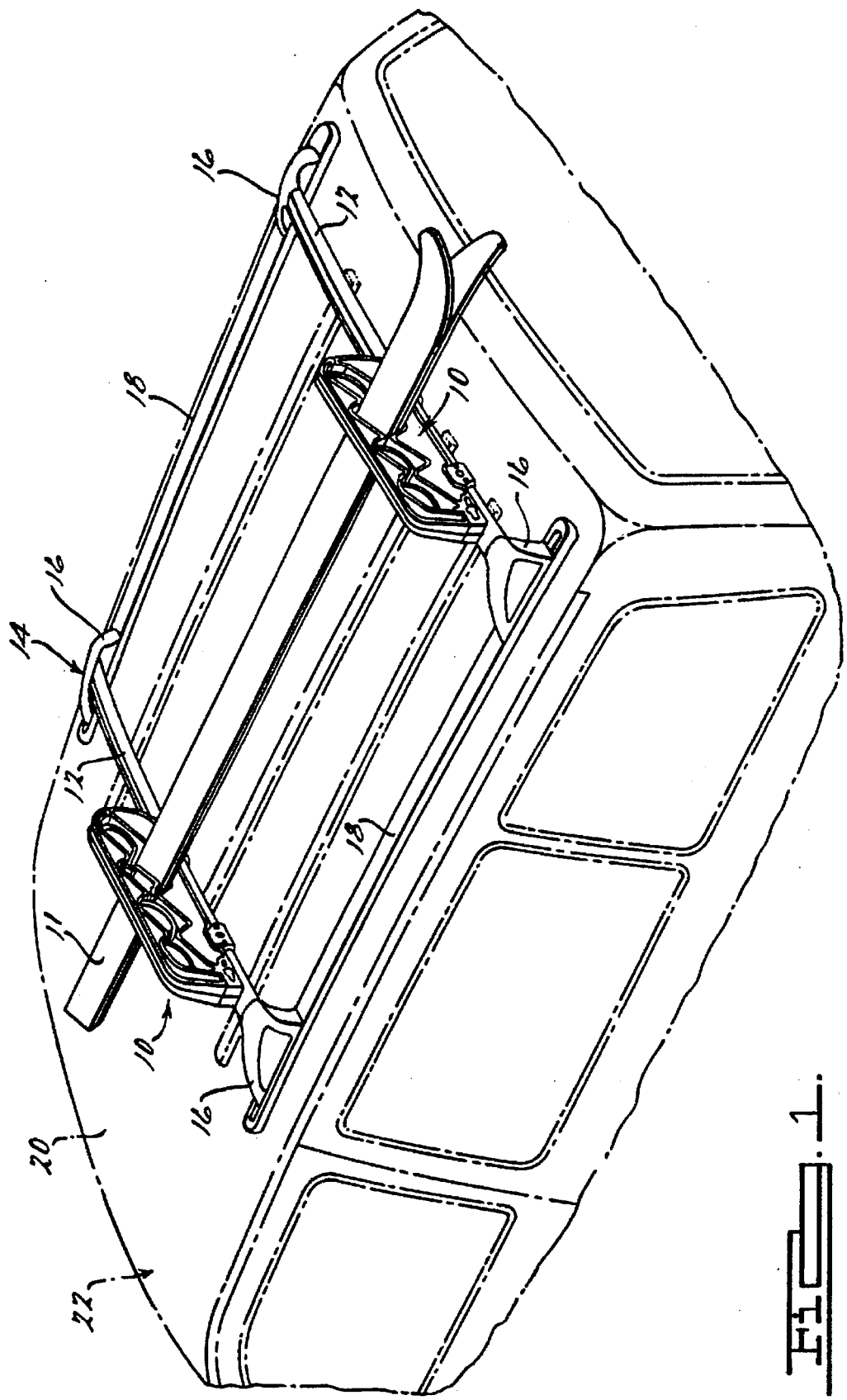
FIG. 1 is a perspective view of an existing vehicle article carrier mounted to an outer body surface of a vehicle, and illustrating in perspective fashion a pair of ski racks in accordance with the preferred embodiments of the present invention releasably secured to associated cross bars of the existing vehicle article carrier.

Referring to FIG. 1, there is shown a pair of ski racks 10 for securing a pair of skis 11. Each of the ski racks 10 are secured to a cross bar 12 of a vehicle article carrier 14. The vehicle article carrier 14 includes a bracket member 16 at each end of each one of the cross bars 12 which is slidably disposed upon an associated one of a pair of slats 18. Each of the slats 18 are in turn fixedly secured to an outer body surface 20 of a vehicle 22. The bracket member 16 may be fixedly secured to the slats 18 such that they are not moveable along the slats or, alternatively, slidably coupled to the slats such that the cross bar 12 may be adjustably positioned and locked in place at various positions along the lengths of the slats 18. Examples of suitable vehicle article carrier systems for use with the ski rack 10 of the present invention are shown in, for example, U.S. Pat. Nos. 4,684,048; 4,972,983; 4,982,886 and 5,082,158, the disclosures of each of which are hereby incorporated by reference. It is a principal advantage of the ski racks 10 that they can be used with the cross bars of virtually all presently U.S. manufactured article carrying racks.

The ski rack 10 essentially forms an attachment for each of the cross bars 12 which is capable of being quickly and easily removed and attached to an associated one of the cross bars 12 without the need for special tools or lengthy attachment or removal steps. The ski rack 10 also includes a minimum number of individual component parts which make for a relatively inexpensively manufactured system with generally excellent reliability. As will be described in the following paragraphs, the various features of the ski rack 10 enable it to be used with cross bars 12 of varying cross-sectional widths without modification to any independent component parts of the ski rack 10, or any disassembly of the existing vehicle article carrier.

Referring now to FIG. 2, the ski rack 10 generally includes a base portion 24 having a first end 26 and a second end 28, and a clamping arm member 30 having a first end 32 and a second end 34. The second end 34 of the clamping arm member 30 is pivotally secured via a pivot pin 36 extending through a portion thereof and a portion of the base portion 24 to enable the clamping arm member 30 to be moved between an open position, as shown in FIG. 2, and a closed position, as shown in FIG. 1.

With brief reference to FIGS. 3 and 4, the base portion 24 includes an integrally formed hook portion 38 protruding therefrom and an integrally formed channel 40 (FIG. 2) formed in alignment with the integrally formed hook portion 38. More preferably, as shown in FIG. 4, a pair of integrally formed hook portions 38 are formed with the base portion 24 and spaced apart along the length of the base portion 24 to provide two areas at which the ski rack 10 is secured to its associated cross bar 12. Similarly, as shown in FIG. 2, the base portion 24 preferably includes two integrally formed channels spaced apart along the base portion 24 and aligned with the integrally formed hook portions 38.

With further reference to FIGS. 2 and 3, at least one independent securing member 42 is included to form part of the ski rack 10 to enable the ski rack to be clampingly secured to an associated one of the cross bars 12. More preferably, a pair of independent securing members 42, as shown in FIG. 2, are included. Each independent securing member 42 includes a main body portion 44 and a clamping hook portion 46 integrally formed therewith. The hook portion 46 includes a pair of channels 48 formed therein and an opening 50 positioned to allow a threaded fastening member 52 to extend therethrough and into an interior area of an associated one of the channels 40. The main body portion 44 of each independent securing member 42 is adapted to be slidably engaged within an associated one of the integrally formed channels 40, as shown in FIGS. 2 and 3.

To facilitate clamping engagement of the ski rack 10 to an associated cross bar 12, each integrally formed hook portion 38 includes an opening 54 and a recessed portion 56 within which is disposed a fastening element in the form of a threaded nut 58. The fastening element 58 may be press-fit into the recessed portion 56 or adhered therein by a suitable adhesive.

With brief reference to FIG. 4, to enable a wide degree of adjustable positioning of each independent securing member 42, each of the integrally formed hook portions 38 includes a U-shaped opening 60 formed therein. The U-shaped opening 60 enables the main body portion 44 of each independent securing member 42 to protrude therethrough when the independent securing member 42 is used to secure the ski rack 10 to cross bars having a narrower cross-sectional width and to allow the main body portion 44 of each securing member 42 to protrude through the U-shaped opening 60 if necessary, as shown in phantom in FIG. 5.

With further reference to FIGS. 2 and 3, each of the independent securing members 42 further includes a recessed portion 62 formed coaxially with the opening 50. The recessed portion 62 allows a head portion 64 of the fastening member 52 to rest below the level of an outer surface 66 of the independent securing member 42 when the securing member 42 is in use.

With further brief reference to FIG. 2, the base portion 24 includes a saw-tooth shaped upper surface 68 which forms a plurality of independent support surfaces 70. Articles such as snow or water skis are adapted to be placed on each of the support surfaces 70 when the clamping arm member 30 is in its open position. The clamping arm member 30 also includes a plurality of flexible, semi-circular members 72.

With brief reference to FIGS. 6 and 7, the construction of one of the semi-circular members 72 can be seen to include a semi-circular portion 74 and a base portion 76 having a protruding locking portion 78 with a plurality of protruding shoulder portions 80. The protruding locking portions are formed somewhat in the shape of an arrowhead when viewing the members 72 from one end thereof. With specific reference to FIG. 7, the shoulder portions 80 are inserted through a slot 82 formed in the clamping arm member 30. The flexible, semi-circular members 72 is preferably manufactured from rubber or a like deformable material having good resiliency which allows the shoulder portions 80 to be compressed slightly as the base portion 76 is urged towards the clamping arm member 30 in accordance with directional arrow 84. Once the shoulder portions 80 are fully inserted within the clamping arm member 30, as shown in FIG. 7, the semi-circular members 72 cannot be readily removed therefrom. The semi-circular portion 74 is positioned so as to rest against an associated one of the support surfaces 70 when the clamping arm member 30 is in its closed position to enable a pair of articles such as skis to be clamped against the associated support surface gently and without damage to the articles being secured. The deformability of the semi-circular portion 74 further enables articles of varying thicknesses to be accommodated without further adjustment to the ski rack 10. The degree of deformability of one of the semi-circular members 72 can be seen in the drawing of FIG. 4, when the pair of skis 11 (shown in cross-section) are placed on one of the support surfaces 70, and the clamping arm member 30 is in its closed position.

With further reference to FIG. 2, the clamping arm member 30, at the first end 32 thereof, includes a latch member 86 protruding therefrom toward the first end 26 of the base portion 24. The latch member 86 is preferably formed from a rigid material such as metal or alternatively from plastic and is positioned so as to fall within an opening 88 formed within the first end 26 of the base portion 24. The opening 88 is closely adjacent a key-operated locking assembly 90. When the clamping arm member 30 is in its closed position, the latch member 86 extends through the opening 88 and into an interior area of the first end 26 of the base portion 24. A key (not shown) may then be used to lock the locking assembly 90, which causes the latch member 86 to be captured by the locking assembly 90 such that the clamping arm member 30 cannot be lifted into its open position. The locking assembly 90 may be similar or identical to the locking assembly of the ski rack described in U.S. Pat. No. 3,239,115 to Bott, the disclosure of which is hereby incorporated by reference.

Turning now to the installation of the ski rack 10 on an associated one of the cross bars 12, the base portion 24 is rested on top of the associated cross bar 12, as shown in FIG. 3, with the integrally formed hook portion 38 abuttingly engaging a first side portion 92. The main body portion 44 of an associated independent securing member 42 is then inserted into the channel 40 until the hook portion 46 thereof abuttingly engages the second side portion 94 of the cross bar 12. The fastening member 52 is then threadably advanced until the threaded portion thereof engages the fastening element 58. The fastening member 52 is tightened to a sufficient degree such that the hook portions 38 and 46 are clamped around the cross bar 12 sufficiently tight so as not to permit twisting movement of the base portion 24 relative to the cross bar 12. The same procedure is repeated for the other integrally formed hook portion 38 and the other independent securing member 42. At this point, the clamping arm portion 30 can be raised to its open position and one or more articles placed on the support surfaces 70. The clamping arm member 30 is then lowered until the latch member 86 protrudes through the opening 88 into the interior area of the base portion 24. The locking assembly 90 may then be locked to prevent the clamping arm member 30 from being lifted. When in the closed position, the clamping arm member 30, and particularly the flexible, semi-circular members 72 thereof, gently yet securely maintain the articles positioned on the support surfaces 70 stationary.

The ski rack 10, with the exception of the semi-circular members 72 and the locking assembly 90, is preferably injection molded from a suitably high-strength plastic such as PVC. The independent securing members 42 are also likewise preferably formed through conventional injection molding techniques from a suitably high-strength plastic.

The ski rack 10 provides the advantage over prior developed ski racks of having a minimal number of independent component parts and does not require any disassembly of the cross bar 12 or any other component of an existing vehicle article carrier 14 in order to secure it to a cross bar 12 thereof. The ski rack 10, through its integrally formed hook portions 38 and the independent securing members 42, can be slidably positioned at desired points along the length of the cross bar 12 shown in FIG. 1 to enable loads to be distributed more evenly or to enable other articles to be secured to the cross bar 12. The ski rack 10 can also be quickly and easily removed from its cross bar 12 without the need for special tools or complicated and extensive disassembly steps. A principal advantage of the ski rack 10 is its ability to be used with the cross bars of virtually all existing U.S. manufactured article carrier systems without requiring disassembly of, or modification to, any portion of the existing vehicle article carrier.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. An article carrying rack adapted to be releasably secured to a cross bar of a vehicle article carrier wherein the vehicle article carrier is positioned on an outer body surface of a vehicle, said apparatus comprising:

a base portion having a length extending along said article carrier and a surface adapted to support an article thereon and having a first end and a second end;

a clamping arm member having a surface adapted to cooperate with said surface of said base portion to clamp said article therebetween, said clamping arm member having a first end and a second end, said second end being pivotally coupled to said second end of said base portion and said first end of said clamping arm member being adapted to lockably engage with said first end of said base portion to maintain said clamping arm member positioned closely adjacent said base portion, to thereby maintain said article secured between said clamping arm member and said base portion;

said base portion including an integrally formed hook portion in longitudinal alignment with an integrally formed channel formed in a lower surface of said base portion and disposed generally perpendicular to the length of said base portion when said article carrying rack is positioned on said cross bar for attachment thereto;

said base portion further including an independent securing member adapted to slidably engage within said integrally formed channel and including a hook portion adapted to face said integrally formed hook portion of said base portion when said independent securing member is at least partially, slidably inserted within said integrally formed channel, said hook portion being adapted to clampingly engage opposite side portions of said cross bar when said independent securing member is at least partially inserted within said integrally formed channel; and a fastening member adapted to maintain said hook portion clampingly engaged around said side portions of said cross bar to thereby maintain said base portion releasably secured to said cross bar.

2. The apparatus of claim 1, wherein said independent securing member includes:

a main body portion integrally formed with said hook portion, said main body portion being adapted to slidably engage within said integrally formed channel of said base portion; and an opening formed adjacent said main body portion through which said fastening member is positioned so as to enable said fastening member to extend longitudinally within said channel without interfering with said cross bar when said main body portion is at least partially inserted within said integrally formed channel.

3. The apparatus of claim 2, wherein said integrally formed hook portion includes a fastening element adapted to engage with said fastening member when said independent securing member is at least partially inserted within said integrally formed channel, to thereby maintain said hook portion in clamping engagement over said side portions of said cross bar.

4. The apparatus of claim 1, wherein said first end of said clamping arm member includes a latch member; and wherein said base portion includes a locking assembly adapted to engage with said latch member when said clamping arm member is in a closed position to thereby maintain said clamping arm member in said closed position.

5. The apparatus of claim 1, wherein said clamping arm member includes at least one flexible, semi-circular member releasably secured thereto and positioned on said clamping arm member so as to be in facing relation to said surface of said base portion to thereby help secure said article against said surface of said base portion when said clamping arm member is in said closed position.

6. The apparatus of claim 1, wherein said surface of said base portion comprises a saw-tooth shaped surface adapted to support a plurality of articles adjacent one another on said base portion.

7. A ski rack apparatus adapted to be removably secured to a cross bar of a vehicle article carrier, wherein the vehicle article carrier is disposed on an outer body surface of a vehicle, said apparatus comprising:

a base portion having a length extending along said article carrier and at least one integrally formed hook portion adapted to engage a first side portion of said cross bar when said base portion is positioned on said cross bar;

said base portion including a lower surface having an integrally formed channel formed in longitudinal alignment with said integrally formed hook portion, said integrally formed channel being disposed generally perpendicular to the length of said base portion when said apparatus is positioned on said cross bar for attachment thereto;

an independent securing member having a main body portion and a hook portion, with said main body portion being slidably insertable within said integrally formed channel in said base portion such that said hook portion of said independent securing member faces said integrally formed hook portion; and a fastening member operable to secure said independent securing member to said integrally formed hook portion to thereby enable said hook portion to be clamped around said first and second side portions of said cross bar, to thereby enable said base portion to be clamped releasably to said cross bar.

8. The apparatus of claim 7, wherein said independent securing member includes an opening enabling a portion of said fastening member to extend therethrough and into an interior area defined by said integrally formed channel; and wherein said integrally formed hook portion includes a fastening nut positioned in longitudinal alignment with said fastening member so as to engage with said fastening member to permit said hook portion to be clampingly engaged around said cross bar.

9. The apparatus of claim 7, wherein said clamping arm member includes a first end and a second end;

wherein said base portion includes a first end and a second end, said second end of said base portion being pivotally secured to said second end of said clamping arm member; and wherein said first end portion includes a latch member protruding therefrom and said first end of said base portion includes a locking assembly adapted to releasably, lockably engage with said latch member when said clamping arm member is in a closed position closely adjacent said base portion.

10. The apparatus of claim 7, wherein said base portion includes an article supporting surface for supporting an article thereon; and wherein said clamping arm member includes a flexible, semi-circular member positioned so as to face said surface when said clamping arm member is urged into a closed position relative to said base portion, said flexible, semi-circular member cooperating with said surface to clamp said article therebetween when said clamping arm member is in said closed position.

11. The apparatus of claim 7, wherein said clamping arm member includes a plurality of flexible, semi-circular members secured thereto and spaced apart along a longitudinal length of said clamping arm member; and wherein said base portion includes a plurality of support surfaces formed along said base portion so as to be vertically aligned with said plurality of flexible, semi-circular arm members such that when said clamping arm member is moved into a closed position relative to said base portion, articles resting on said support surfaces are clamped thereto by abutting contact with said flexible, semi-circular members.

12. The apparatus of claim 7, wherein said base portion includes a second integrally formed hook portion spaced apart from said integrally formed hook portion; and a second independent securing member spaced apart from said independent securing member to enable said base portion to be clampingly engaged to said cross bar at two independent locations along a length of said cross bar.

13. The apparatus of claim 7, wherein said base portion includes a saw-tooth shaped surface defining a plurality of independent support surfaces spaced apart from one another for supporting a corresponding plurality of independent articles thereon.

14. The apparatus of claim 7, wherein said integrally formed hook portion includes a recess formed therein; and a fastening element disposed within said recess for engaging with said fastening member of said independent securing member.

15. A ski rack apparatus for supporting a plurality of skis above an outer body surface of a vehicle, said apparatus comprising:

a pair of slats fixedly secured to said outer body vehicle surface;

a cross bar having a bracket member at each end thereof, said bracket member being adapted to be secured to said slats to enable said cross bar to be positioned above said outer body surface;

a ski rack assembly comprising:

a base portion having a length extending along said cross bar and at least one integrally formed hook portion, a lower surface and an integrally formed channel on said lower surface, said channel extending generally perpendicular to the length of said base portion when said apparatus is positioned on said cross bar for attachment thereto;

at least one independent securing member adapted to slidably engage within said integrally formed channel and including a clamping hook portion disposed so as to face said integrally formed hook portion of said base portion when said independent securing member is at feast partially, slidably inserted within said integrally formed channel, to thereby enable said clamping hook portion and said integrally formed hook portion to clampingly engage opposite side portions of said cross bar to secure said base portion to said cross bar; and a clamping arm member secured to said base portion and moveable between an open position, wherein articles may be positioned on said base portion, and a closed position wherein said clamping arm member abuttingly engages said article to thereby clamp said article between said clamping arm member and said base portion.

16. The apparatus of claim 15, wherein said independent securing member includes a fastening member; and wherein said integrally formed hook portion includes a fastening element operable to engage with said fastening member when said independent securing member is at least partially inserted within said integrally formed channel, to thereby enable said clamping hook portion to clampingly engage said cross bar.

17. The apparatus of claim 15, wherein said base portion includes a saw-tooth shaped upper surface defining a plurality of adjacent support surfaces upon which a plurality of said articles may be placed when said clamping arm member is in said open position.

18. The apparatus of claim 15, wherein said clamping arm member includes a latch member; and wherein said base portion includes a locking assembly adapted to lockably engage with said latch member when said clamping arm member is in said closed position.

19. The apparatus of claim 15, wherein said clamping arm member includes a first end and a second end, said second end being pivotally secured to a portion of said base portion such that said clamping arm member may be moved pivotally between said open position and said closed position.

20. The apparatus of claim 15, wherein said clamping arm member and said base portion are injection molded from plastic.

* * * * *